United States Patent [19]

Meisel

[11] 4,256,794

[45] Mar. 17, 1981

[54] BLOCKING FOIL

[75] Inventor: Fritz Meisel, Fürth, Fed. Rep. of Germany

[73] Assignee: Messrs. Leonhard Kurz, Fürth, Fed. Rep. of Germany

[21] Appl. No.: 1,296

[22] Filed: Jan. 5, 1979

[30] Foreign Application Priority Data

Jan. 7, 1978 [DE] Fed. Rep. of Germany ....... 2800635

[51] Int. Cl.[3] ......................... B32B 3/00; B32B 15/08

[52] U.S. Cl. .................................... 428/195; 428/205; 428/209; 428/210; 428/325; 428/329; 428/332; 428/432; 428/440

[58] Field of Search ............... 428/195, 200, 205, 209, 428/210, 325, 329, 432, 440, 332, 202, 457

[56] References Cited

U.S. PATENT DOCUMENTS

| | | | |
|---|---|---|---|
| 3,117,886 | 1/1964 | Glynn | 428/205 |
| 4,090,006 | 5/1978 | Havas et al. | 428/432 X |
| 4,161,560 | 7/1979 | Kienel | 428/432 X |

*Primary Examiner*—Thomas J. Herbert, Jr.

[57] ABSTRACT

A composite foil for imparting a decorative effect to a substrate comprises a carrier film, a decorating layer secured thereto either directly or by way of a release layer, and an adhesive coating secured on the decorating layer either directly or by way of an adhesion-facilitating layer, said decorating layer comprising at least one layer of glass or glass-like material deposited by high vacuum vaporization.

5 Claims, 4 Drawing Figures

BLOCKING FOIL

Figure 1:
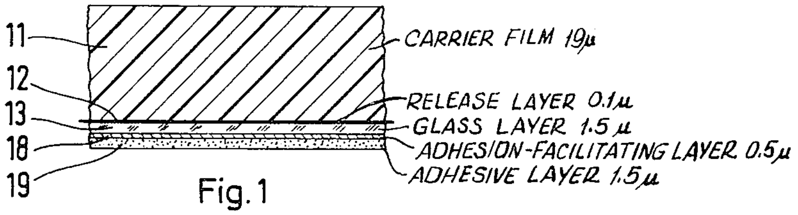

The invention relates to a blocking foil, particularly a hot blocking foil, comprising a carrier film, a covering layer releasably connected thereto possibly by way of a release layer, and an adhesive layer for securing the covering layer to a substrate, said adhesive layer being disposed on the side of the covering layer remote from the carrier film and possibly being connected to said covering layer by way of an adhesion-facilitating layer.

Blocking foils, particularly hot blocking foils, serve to decorate the surface of a substrate, for example of paper, cardboard or plastics. The covering layer forming the actual decoration is applied by way of a release layer such as wax or a release lacquer to a carrier of paper or plastics film, e.g. cellophane or high polymers such as polyethylene terephthalate, polyamide, polyolefin, cellulose acetate and triacetate, PVC or the like. The side of the covering layer remote from the carrier film is provided with an adhesive layer which causes the covering layer to bond to the substrate, possibly under the action of heat as well as pressure. The release layer is such that it permits the carrier film to be separated from the covering layer during the blocking process without difficulty, especially under the influence of heat.

The covering layer which generally forms a decoration can be of various forms. For example, it can be a metal layer, a color-imparting lacquer or decorations consisting of a plurality of lacquer layers, it being possible to provide additional three-dimensional patterning.

After transfering the covering layer or decorative layer onto the substrate by removing the carrier film, one obtains in this way decorative surfaces of high quality and with configurations which can differ widely. However, it has to be borne in mind that one can transfer only relatively thin lacquer layers or very thin metal layers. Consequently, surfaces made or decorated with the aid of blocking foils have the disadvantage that they have only a low resistance to scratching and wear. By reason of the thin layers that are employed, it is also relatively easy for water or chemicals to penetrate under the covering layer, thereby markedly reducing the adhesion of the laminate or covering layer to the decorated substrate. Especially in the case of blocking foils with a metallic decorating layer, the penetration of water can be instrumental in destroying the metal coating by forming hydroxyl-containing oxides.

It is an object of the present invention to suggest a way of improving the scratch and abrasion resistance as well as chemical stability to a considerable extent in the case of surfaces decorated with blocking foils, and particularly hot blocking foils.

According to the invention, the covering layer comprises at least one layer of glass or glass-like material deposited by high vacuum vaporization.

The use of a glass layer provides the advantage of considerably improving the abrasion resistance and chemical stability of the blocking foil because the abrasion and scratch resistance of a glass-like layer is a multiple of that of hitherto conventional layers. The improvement in mechanical strength and chemical stability that one can achieve depends on the thickness of the glass layer and the nature of the glass or glass-like material. It has also been found that the use of a glass layer according to the invention also gives improved resistance to solvents and much better results under outdoor weather influences, even the temperature stability of a blocking foil according to the invention being considerably higher than for conventional blocking foils with a lacquer system.

The layer of glass or glass-like material is vaporized onto the carrier film under high vacuum. Vaporization is, for example, effected by thermal action, by cathodic sputtering or by means of electron beam evaporation, the latter having been found particularly favourable because it is much more economical than the other two methods which give relatively low evaporation rates.

As glass for making the glass layer one can use pure silicate glasses, borosilicate glasses, as well as all other types of glasses which can be evaporated without difficulty.

In the simplest case, the entire covering layer of the blocking foil consists of only the glass layer. Such a blocking foil can, for example, be used in order subsequently to protect mechanically and against chemical attack those surfaces which have been decorated in some other manner. However, apart from the glass protecting layer, the covering layer will normally be such that a certain decorative effect is also achieved. This can, for example, be obtained by a colored glass layer or in that one side of the glass layer is covered by a transparent coloring lacquer. In these cases, the existing underlying surface appears through the glass layer. This can, for example, be significant when the blocking foil comprises a metallic layer. One can then use, for example, aluminum and produce a gold decorating foil by appropriately coloring the glass layer.

Another possibility of adapting the blocking foil for decorative purposes is in that the covering layer comprises at least one layer of a pigmented lacquer on the side of the glass layer remote from the carrier film. In this case the surface of the substrate is covered.

Further, it is possible to construct the blocking foil such that on the side of the glass layer remote from the carrier film there is at least one decorative lacquer layer which can possibly define a three-dimensional pattern, it being preferred that the at least one decorative lacquer layer is covered on the side facing the adhesive layer with a covering layer which is desirably a highly pigmented lacquer layer.

Another way of constructing the blocking foil is such that the covering layer comprises a metal layer which is disposed on the side of the glass layer or decorative lacquer layer remote from the carrier film and which is preferably vaporized on in a vacuum. Blocking foils with a metal layer give a particularly decorative and valuable appearance. The metal layer, which is usually extremely thin, is reliably protected from scratching etc. by the glass layer. Where the covering layer is formed solely by the glass layer, i.e. with blocking foils provided for protecting a surface after it has already been decorated in some form, the adhesive layer and possibly the adhesion-facilitating layer must likewise be transparent so as not to spoil the appearance.

Tests have shown that it is sufficient if the glass layer is less than $3\mu$ thick, preferably between 0.5 and $1.5\mu$.

The metals can be Al, Cr, Ni, Cu, W, Mo, Ag, Au, Cd, Sb or alloys of these metals. The metals are deposited by high vacuum vaporization using conventional methods, for example by means of thermal evaporation, electron beam evaporation, cathodic sputtering etc.

The pigmented coloring lacquers can be those on the basis of all known conventional lacquer binders. The pigments can be inorganic or finely dispersed metal powder. It is also possible to employ soluble dyes for colorizing. As already mentioned, the covering layer serving decorative purposes may be a single layer (one color) or multi-layered in different colors and patterns, e.g. to produce decorated faces representing simulated timber, ornamental pictures or endless decorations.

The adhesive layer is generally a heat seal layer which adheres well to the covering layer as well as the surface of the substrate to be treated. If the bond between the heat seal layer and the covering layer is inadequate, an adhesion-facilitating or enhancing layer is employed, as is usual in most cases.

Additional features, details and advantages of the invention will become evident from the following description of a few examples in conjunction with the drawing which shows diagrammatic sections through a few hot blocking foils.

EXAMPLE 1 (FIG. 1)

This foil is a scratch resistant protective layer of high gloss, intended for subsequently protecting surfaces that have already been decorated or for protecting surfaces that require no decoration.

It comprises the following layers in the thicknesses as stated

| | |
|---|---|
| 11: carrier film, e.g. polyester | 19.0μ |
| 12: release layer (wax layer) | 0.1μ |
| 13: glass layer (vaporized on in vacuum) | 1.5μ |
| 18: adhesion-facilitating layer (transparent) | 0.5μ |
| 19: heat seal layer (transparent as adhesive layer) | 1.5μ |

EXAMPLE 2 (FIG. 2)

This is a silver-colored high gloss foil. It comprises the following layers of stated thickness:

| | |
|---|---|
| 21: carrier film, e.g. polyester | 12.0μ |
| 22: release layer (wax layer) | 0.1μ |
| 23: glass layer (vaporized on in vacuum) | 1.0μ |
| 24: metal layer, e.g. A1 (vaporized on in vacuum) | 0.05μ |
| 28: adhesion-facilitating layer (need not be transparent) | 0.3μ |
| 29: heat seal layer as adhesive layer | 1.5μ |

Figure 2:
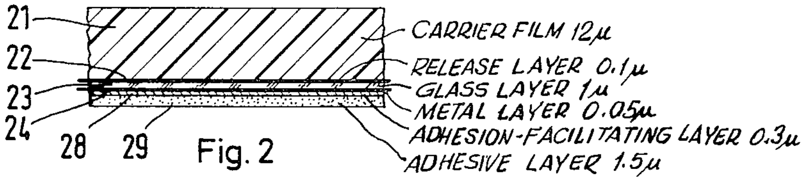
Figure 3:
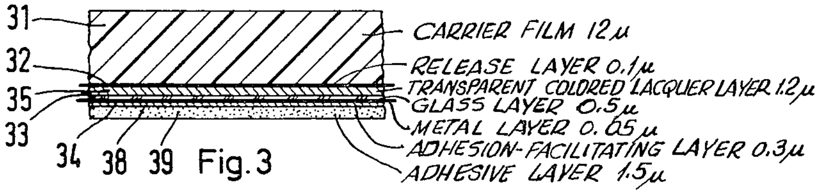
Figure 4:
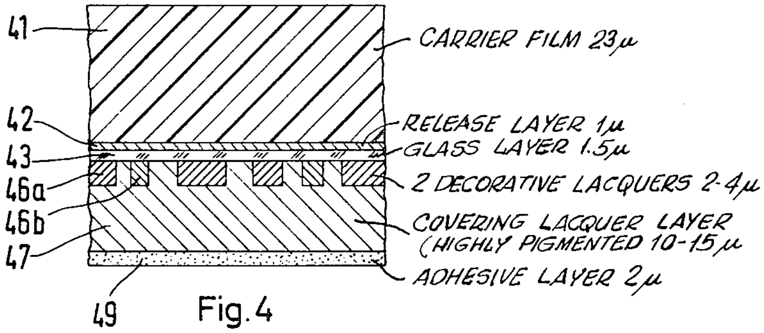

EXAMPLE 3 (basically same construction as FIG. 2)

This is a weather resistant chromium foil which can for example be used for the surface coating of plastics parts in and on motor vehicles. It comprises the following layers of stated thickness:

| | |
|---|---|
| carrier film, e.g. polyester | 19.0μ |
| release layer (releasing lacquer) | 1.0μ |
| glass layer (vaporized on in vacuum) | 1.5μ |
| chromium layer (vaporized on in vacuum) | 0.05μ |
| adhesion-facilitating layer | 0.5μ |
| heat seal layer as adhesive layer | 2.5μ |

EXAMPLE 4 (FIG. 3)

This hot blocking foil is a gold-colored high gloss foil but in which a silver-colored metal layer such as Al is used. It comprises the following layers of stated thickness:

| | |
|---|---|
| 31: carrier film, e.g. polyester | 12.0μ |
| 32: release layer (wax layer) | 0.1μ |
| 35: orange-colored transparent lacquer layer | 1.2μ |
| 33: glass layer (vaporized on in vacuum) | 0.5μ |
| 34: metal layer, e.g. A1 (vaporized on in vacuum) | 0.05μ |
| 38: adhesion-enhancing layer | 0.3μ |
| 39: heat seal layer as adhesive layer | 1.5μ |

The arrangement of the orange-colored transparent lacquer layer 35 and the glass layer 33 can be interchanged, in which case the glass layer 33 then directly adjoins the release layer 32 and the transparent lacquer layer 35 would be between the glass layer 33 and the metal layer 34.

EXAMPLE 5 (FIG. 4)

This is a foil with a wood decoration and having a higher abrasion resistance and chemical stability than hitherto known blocking foils with wood decorations.

It comprises the following layers having thicknesses as stated:

| | |
|---|---|
| 41: carrier film, e.g. polyester | 23.0μ |
| 42: release layer (separating lacquer) | 1.0μ |
| 43: glass layer (vaporized on in vacuum) | 1.5μ |
| 46a | |
| 46b: two or more lacquers applied by pressure rollers patterned to simulate veneer | 2.0 to 4.0μ |
| 47: highly pigmented colored lacquer layer with a high covering power | 10.0 to 15.0μ |
| 49: heat seal layer as adhesive layer | 2.0μ |

The number of lacquer layers applied by pressure rollers depends on what pattern is to be produced. For wood decorations, two different colors are generally sufficient. Any gaps between the lacquers applied under pressure or by printing are filled out by the lacquer with high covering power forming the layer 47.

It will be evident that a multiplicity of changes can be made to the above examples, depending on what decorative effect is to be obtained in a particular case. The thickness and nature of the glass layer depends on the intended purpose of use.

The glass layer may not only be glass in the true sense but also glass-like compounds, for example oxide layers such as those used to coat optical lenses. These glass-like compounds can in some cases be vaporized more easily and with less power consumption.

I claim:

1. A blocking foil comprising a carrier film, a covering layer, a release layer releaseably connecting said covering layer to said carrier film, an adhesive layer for securing said covering layer to a substrate, said adhesive layer being disposed on the side of said covering layer remote from said carrier film, and an adhesion-facilitating layer connecting said adhesive layer to said covering layer, said covering layer comprising a layer of glass deposited by high vacuum vaporization and also comprising a metal layer disposed on said glass layer on that side which is remote from said carrier film.

2. The foil of claim 1, wherein the glass layer is colored.

3. The foil of claim 1, wherein the metal layer is deposited by vacuum vaporization.

4. The foil of claim 1, wherein the glass layer is under 3μ thick.

5. The foil of claim 1, wherein the glass layer is applied by electron beam vaporization.

* * * * *